(12) United States Patent
Banga

(10) Patent No.: US 6,938,086 B1
(45) Date of Patent: Aug. 30, 2005

(54) AUTO-DETECTION OF DUPLEX MISMATCH ON AN ETHERNET

(75) Inventor: Gaurav Banga, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/578,218

(22) Filed: May 23, 2000

(51) Int. Cl.[7] ......................... H04L 5/14; H04L 12/413
(52) U.S. Cl. ..................... 709/227; 370/276; 370/278; 370/282; 370/296; 709/228
(58) Field of Search ................ 709/227, 224, 709/228, 230; 370/230, 276, 278, 282, 296

(56) References Cited

U.S. PATENT DOCUMENTS

| | | | | |
|---|---|---|---|---|
| 4,680,781 A | * | 7/1987 | Amundson et al. | 375/222 |
| 4,937,763 A | | 6/1990 | Mott | 364/550 |
| 5,067,099 A | | 11/1991 | McCown et al. | 364/550 |
| 5,121,382 A | * | 6/1992 | Yang et al. | 370/250 |
| 5,305,306 A | * | 4/1994 | Spinney et al. | 370/296 |
| 5,311,114 A | * | 5/1994 | Sambamurthy et al. | 370/296 |
| 5,388,091 A | * | 2/1995 | Kagawa | 370/250 |
| 5,490,271 A | * | 2/1996 | Elliott et al. | 710/268 |
| 5,561,666 A | * | 10/1996 | Christensen et al. | 370/276 |
| 5,574,722 A | * | 11/1996 | Slykhouse et al. | 370/257 |
| 5,610,903 A | * | 3/1997 | Crayford | 370/213 |
| 5,838,688 A | * | 11/1998 | Kadambi et al. | 370/445 |
| 6,078,591 A | * | 6/2000 | Kalkunte et al. | 370/448 |
| 6,366,567 B1 | * | 4/2002 | Singh et al. | 370/296 |
| 6,457,055 B1 | * | 9/2002 | Hwong et al. | 709/227 |
| 6,580,697 B1 | * | 6/2003 | Gardner et al. | 370/296 |
| 6,665,275 B1 | * | 12/2003 | Davy et al. | 370/282 |
| 6,704,280 B1 | * | 3/2004 | Mangin et al. | 370/230 |

FOREIGN PATENT DOCUMENTS

EP        0537098        4/1993

* cited by examiner

Primary Examiner—Rupal Dharia
Assistant Examiner—April Baugh
(74) Attorney, Agent, or Firm—Swernofsky Law Group PC

(57) ABSTRACT

A method and system for auto-detection of communication mismatch, such as in a networking environment. A device using a communication protocol uses a technique for protocol augmentation to determine sufficient information about whether there is a protocol parameter mismatch, and to determine how to adjust its protocol parameters so that the parameter mismatch is obviated. In a preferred embodiment, the protocol includes an Ethernet protocol, and the mismatch includes information about whether devices at ends of a communication link are using half-duplex or full-duplex settings. A first device using the Ethernet generates messages that force a set of second devices using the same Ethernet to generate responsive messages to send to the first device; the first device determines, by examining features of the responsive messages from the second devices, what protocol settings the second devices are using.

10 Claims, 3 Drawing Sheets

AUTO-DETECTION OF DUPLEX MISMATCH ON AN ETHERNET

BACKGROUND OF THE INVENTION

1. Field of the Invention

This invention relates to auto-detection of a communication mismatch, such as in a networking environment.

2. Related Art

In communication systems, it is often necessary to configure differing devices at remote ends of communication network with matching communication parameters. One common circumstance in which this can be important occurs when two devices are coupled using a LAN (local area network), such as an Ethernet, but are logically located relatively remotely. For example, the two devices might include an end-host and a switch, maybe belonging to either different organizations or different administrative domains within a single organization. A parameter mismatch may occur when the devices treat the communication link as either half-duplex or full-duplex where a first one of the devices treats the communication link as half-duplex, while a second one of the devices will treat the communication link as full-duplex. When devices are configured so that such a duplex mismatch occurs, substantial degradation in communication bandwidth and other performance characteristics often results.

One problem with known systems using Ethernet protocols is that the Ethernet protocol standard does not contain sufficient logic to auto-detect and to resolve such parameter mismatches. In consequence, attempting to determine the cause of, and attempting to correct, performance problems that originate as a result of a protocol mismatch can be quite difficult. This process is generally manual and often involves inspection of the configurations of both communicating devices. Because the communicating devices often belong to either different organizations or different administered domains within a single organization, parameter mismatches, particularly duplex mismatches, can occur quite often. Duplex mismatches can lead to significant loss of time on the part of system administrators, loss of effective communication for a length of time, and a relatively excessive number of calls for technical support.

Accordingly, it would be advantageous to provide a technique for auto-detection of communication mismatches that is not subject to drawbacks of the known art.

SUMMARY OF THE INVENTION

The invention provides a method and system for auto-detection of communication mismatches, such as in a networking environment. A device using a communication protocol uses a technique for protocol augmentation (similar to that described in the Incorporated Disclosure) to determine sufficient information about whether there is a protocol parameter mismatch (such as, for example, a duplex parameter mismatch,) and to determine how to adjust its protocol parameters so that the parameter mismatch is obviated. In a preferred embodiment, the protocol includes an Ethernet protocol, and the mismatch includes information about whether the devices at the end of a communication link are using half-duplex or full-duplex settings. A first device using the Ethernet generates messages that force any one of a set of second devices using the same Ethernet to generate responsive messages to send to the first device; the first device determines, by examining features of the responsive messages from the responding set of second devices, what protocol settings the set of second devices is using. With this information, the first device can adjust its protocol parameter settings to match the responding second device. In a preferred embodiment, the procedure is best used with a set of second devices that includes five or more responding devices.

The invention provides an enabling technology for a wide variety of applications for computer assisted automatic error detection and diagnosis of communication parameters, so as to obtain substantial advantages and capabilities that are novel and non-obvious in view of the known art. Examples described below primarily relate to auto-detection of duplex mismatch on an Ethernet, but the invention is broadly applicable to many different types of communication and networking systems.

DETAILED DESCRIPTION OF THE PREFERRED EMBODIMENT

Figure 1A:
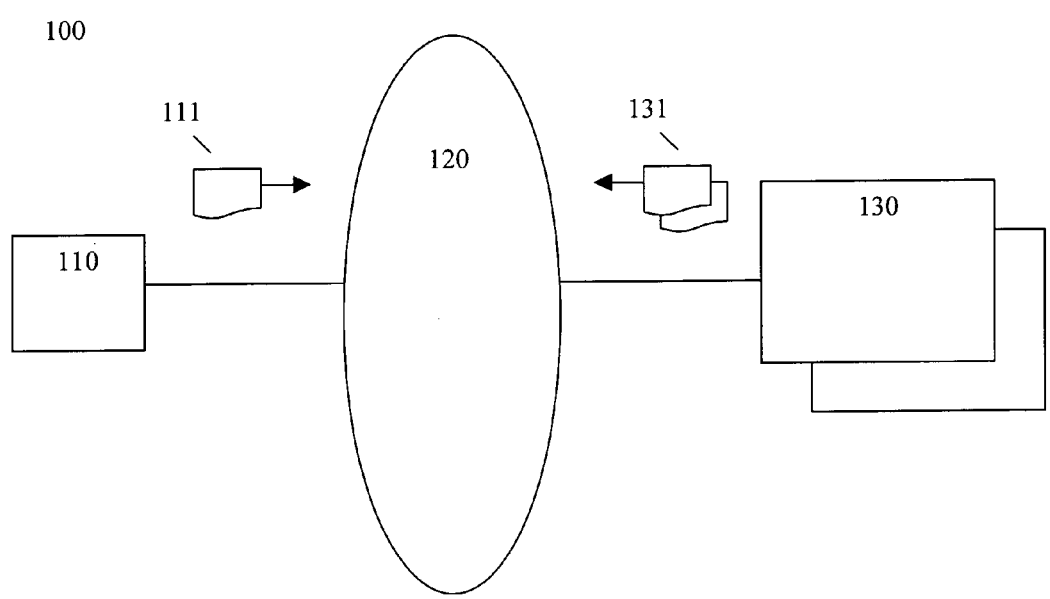
FIG. 1 (collectively including FIG. 1A and FIG. 1B) shows a block diagram of a system for auto-detection of duplex mismatch on an Ethernet.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

error detection and diagnosis—In general, a technique for detecting errors and other failures, and for determining a likely cause thereof lower-level and higher-level protocols—In general, these terms refer to a relationship between two protocols, particularly to their relationship as a higher-level protocol which relies on operation of a lower-level protocol and which is able to alter parameters of the lower-level protocol, not necessarily to any particular protocols.

manipulating parameters—In general, a technique for using a higher-level protocol to determine whether a lower-level protocol is operating relatively efficiently using a set of selected parameters for the lower-level protocol, and using the lower-level protocol to repeatedly and rapidly alter those selected parameters so as to find an optimal set of selected parameters.

monitoring statistics—In general, information regarding performance of the file server or other device.

network protocol—In general, a technique for communication between devices, such as, for example, between: (a) the file server or other device; and (b) a point external to the file server or other device.

protocol augmentation—In general, a technique for using a higher-level protocol to determine whether a lower-level protocol is operating relatively efficiently using a set of selected parameters for the lower-level protocol, and using the lower-level protocol to repeatedly and rapidly alter those selected parameters so as to find an optimal set of selected parameters.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

RELATED APPLICATION

This application is able to use technology disclosed in the following documents:

U.S. patent application Ser. No. 09/456,027, filed Dec. 12, 1999, in the name of the same inventor, titled "Computer Assisted Automatic Error Detection and Diagnosis of File Servers".

This document is hereby incorporated by reference as if fully set forth herein. This document is sometimes referred to herein as the "Incorporated Disclosure."

Figure 1B:
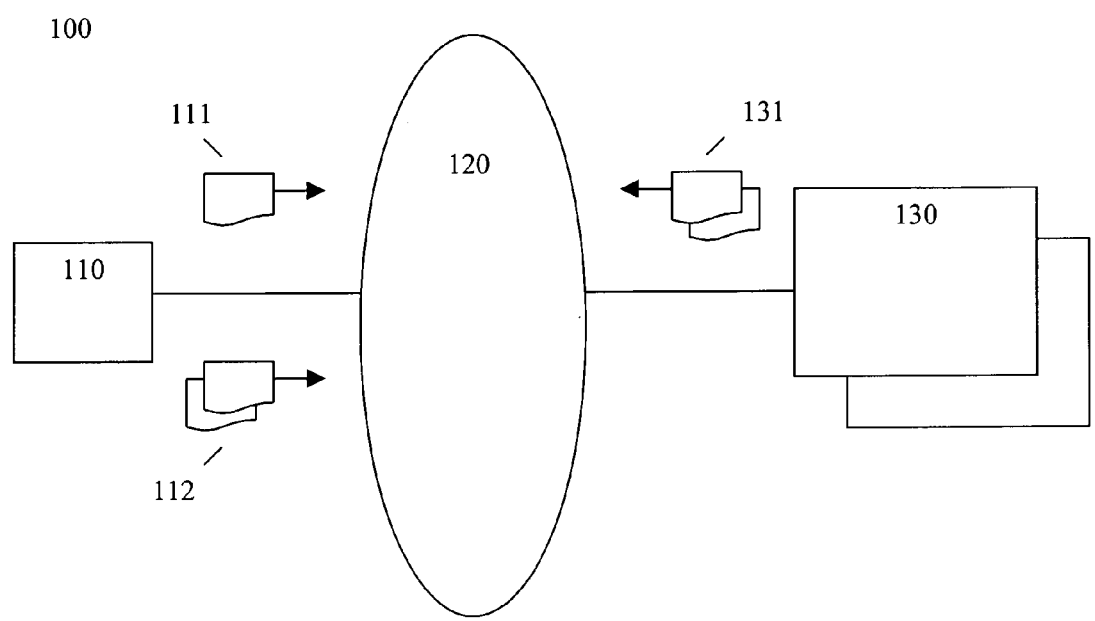

System Elements FIG. 1 (collectively including FIG. 1A and FIG. 1B) shows a block diagram of a system for auto-detection of duplex mismatch on an Ethernet.

A system 100 includes a first device 110, a communication network 120, and a set of second devices 130.

The first device 110 can include any device capable of communication using an Ethernet protocol, and capable of carrying out the procedures described herein. In a preferred embodiment, the first device 110 includes a computer having a processor, program and data memory, mass storage, and coupled to the communication network 120. As used herein, the term "computer" is intended in its broadest sense, and includes any device having a programmable processor or otherwise falling within the generalized Turing machine paradigm.

The communication network 120 includes any technique for sending information between the file server 110 and at least one point outside the file server 110. In a preferred embodiment, the communication network 120 includes a LAN, such as an Ethernet. In alternative embodiments, the communication network 120 can include another type of computer network, such as an Internet, intranet, extranet, or a virtual private network, or a non-computer network, such as a direct communication line, a switched network such as a telephone network, or some combination thereof. In such alternative embodiments, the communication network 120 would likely include some other communication protocol other than an Ethernet protocol.

Similar to the first device 110, the set of second devices 130 can include any device capable of communication using an Ethernet protocol, and capable of carrying out the procedures described herein. In a preferred embodiment, the set of second devices 130 includes computers having a processor, program and data memory, mass storage, and coupled to the communication network 120. When a member of the set of second devices 130 responds to the first device 110, that second device is termed herein a "responding second device."

FIG. 1A shows a block diagram of a first use of the system 100.

In a first use of the system 100, the first device 110 sends a first message 111 (called herein a "reverse packet trigger" message), using the communication network 120, to the set of second devices 130. As described below, the reverse packet trigger message 111 prompts any number of the set of second devices 130 to generate a second message 131 (called herein an "induced packet" message) in response to the reverse packet trigger message 111. The responding devices in the set of second devices 130 thus generate and send a sequence of induced packet messages 131, using the communication network 120, back to the first device 110. The first device 110 is thus able to measure a response to the reverse packet trigger message 111 from the responding devices in the set of second devices 130, such as by counting the number of induced packet messages 131 received from any responding device at the first device 110. This count is relevant to parameter settings at the responding second devices 130.

FIG. 1B shows a block diagram of a second use of the system 100.

In a second use of the system 100, the first device 110 sends the reverse packet trigger message 111, using the communication network 120, to a responding device in the set of second devices 130. Similar to FIG. 1A, the reverse packet trigger message 111 prompts a responding second device 130 to generate an induced packet message 131 in response to reverse packet trigger message 111. The responding second device 130 thus generates a sequence of induced packet messages 131, using the communication network 120, back to the first device 110.

In this second use of the system 100, the first device 100 sends a sequence of third messages 112 (called herein "jam packet" messages), using the communication network 120, to the set of responding second devices 130. If either the first device 110 or a responding second device 130 is configured for half-duplex communication using the communication network 120, the jam packet messages 112 will interfere with the induced packet messages 131, thus reducing the number of induced packet messages 131 received at the first device 110. The first device 110 is thus able to measure the response to the reverse packet trigger message 111 from a responding second device 130, such as by counting the number of induced packet messages 131 from that responding second device received at the first device 110. The first device 110 is thus also able to determine a difference between the number of induced packet messages 131 received at the first device 110 under conditions in which jam packet messages 112 either are or are not present on the communication network 120. This difference is also relevant to parameter settings at the responding second devices 130.

Method of Operation

Figure 2:
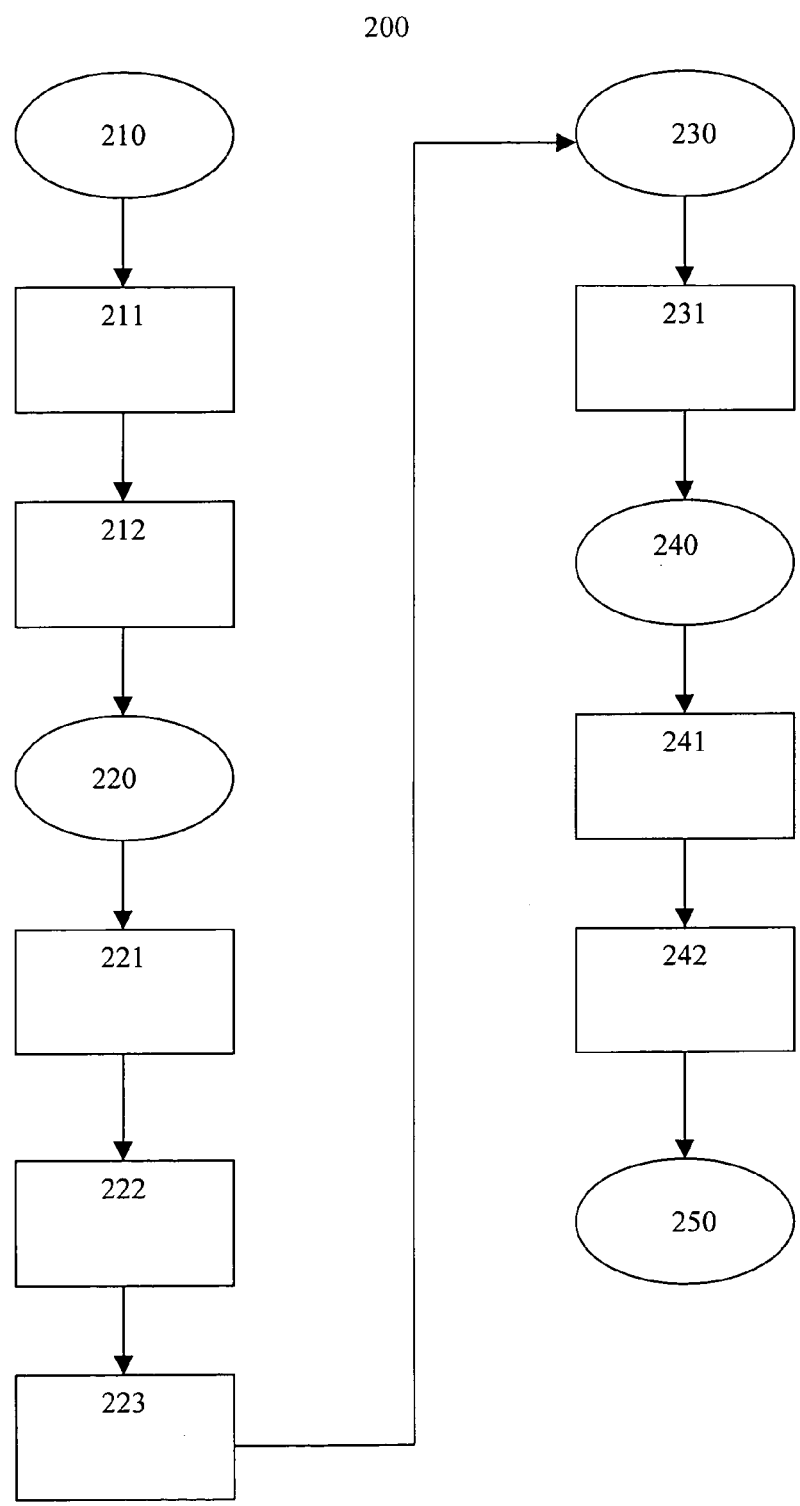
FIG. 2 shows a process flow diagram of a method for operating a system for auto-detection of duplex mismatch on an Ethernet.

FIG. 2 shows a process flow diagram of a method for operating a system for auto-detection of duplex mismatch on an Ethernet.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

A portion of the method 200 from the flow point 210 to the flow point 220 corresponds to the first step described above with regard to FIG. 1A.

At a flow point 210, the first device 110 is ready to determine parameter settings for a number of devices included in a set of second devices 130 coupled to the communication network 120. The number of devices included in the set of second devices 130 is preferably five or greater. When a member of the set of second devices 130 responds to the first device 110, that second device is termed herein the "responding second device."

At a step 211, the first device 110 sends the reverse packet trigger message 111, using the communication network 120, to the responding second device 130. As part of this step, the communication network 120 attempts to deliver the reverse packet trigger message 111 to the responding second device 130. As part of this step, the responding second device 130 attempts to receive the reverse packet trigger message 111.

In a preferred embodiment, the reverse packet trigger message 111 can include any packet, or sequence of packets, which when received by the responding second device 130, would have the effect of causing the responding second device 130 to generate a message back to the first device 110 in response. For example, the reverse packet trigger message 111 can include an ICMP ECHO request, a layer 2 PING message, or some other message to which, according to the protocol used on the communication network 120, the responding second device 130 must respond.

At a step 212, if the responding second device 130 has received the reverse packet trigger message 111, the responding second device 130 generates an induced packet message 131 in response to the reverse packet trigger message 111. As part of this step, the communication network 120 attempts to deliver the induced packet message 131 to the first device 110. As part of this step, the first device 110 attempts to receive the induced packet message 131.

The responding second device 130 thus generates and sends a sequence of induced packet messages 131, using the communication network 120, back to the first device 110. The first device 110 is thus able to measure a response to the reverse packet trigger message 111 from the responding second device 130, such as by counting the number of induced packet messages 131 received at the first device 110. This count is relevant to parameter settings at the responding second device 130.

The first device 110 repeats the step 211 and the step 212 for a length of time, sufficient to acquire information regarding a number of induced packet messages 131 received by the first device 110 from the responding second device 130.

At a flow point 220, the first device 110 is thus able to determine a number of induced packet messages 131 sent by the responding second device 130 in response to the sequence of reverse packet trigger messages 111 sent by the first device 110.

A portion of the method 200 from the flow point 220 to the flow point 230 corresponds to the second step described above with regard to FIG. 1B.

At a step 221, the first device 110 sends the reverse packet trigger message 111, using the communication network 120, to the responding second device 130. As part of this step, the communication network 120 attempts to deliver the reverse packet trigger message 111 to the responding second device 130. As part of this step, the responding second device 130 attempts to receive the reverse packet trigger message 111.

At a step 222, the first device 110 also sends the jam packet message 112, using the communication network 120, to the responding second device 130. As part of this step, the communication network 120 attempts to deliver the jam packet message 112 to the responding second device 130. As part of this step, the responding second device 130 attempts to receive the jam packet message 112.

At a step 223, if the responding second device 130 has received the reverse packet trigger message 111, the responding second device 130 generates an induced packet message 131 in response to the reverse packet trigger message 111. As part of this step, the communication network 120 attempts to deliver the induced packet message 131 to the first device 110. As part of this step, the first device 110 attempts to receive the induced packet message 131.

The responding second device 130 thus generates and sends a sequence of induced packet messages 131, using the communication network 120, back to the first device 110. However, if the responding second device 130 is configured to treat the communication network 120 as half-duplex, jam packet messages 112 present on the communication network 120 cause the responding second device 130 to delay sending induced packet messages 131 until the jam packet messages 112 are no longer present.

The first device 110 repeats the step 212, the step 222, and the step 223 for a length of time, sufficient to acquire information regarding a number of induced packet messages 131 received by the first device 110 while jam packet messages 112 are present on the communication network 120.

At a flow point 230, the first device 110 is able to measure a response to the reverse packet trigger message 111 while jam packet messages 112 are present on the communication network 120, such as by counting the number of induced packet messages 131 received at the first device 110. This count is relevant to parameter settings at the responding second device 130.

At a step 231, the first device 110 uses the measures from the flow point 220 and the flow point 230 to determine protocol parameters used by the responding second device 130 relating to half-duplex or full-duplex use of the communication network 120. This step includes the following sub-steps:

- At a sub-step 231(*a*), the first device 110 determines how it has configured its own protocol parameters for the communication network 120. These protocol parameters can be either half-duplex or full-duplex.
- At a sub-step 231(*b*), the first device 110 determines whether there is a relatively normal number of induced packet messages 131 received from the responding second device 130.
- At a sub-step 231(*c*), the first device 110 determines whether there is a relatively large number of collisions between induced packet messages 131 received from the responding second device 130 and jam packets 112 sent by the first device 110. As part of this sub-step, the first device 110 determines whether a substantial percentage of these collisions are late collisions.
- If the first device 110 has configured its own protocol parameters as half-duplex, then the responding second device 130 will have a protocol mismatch only if the responding second device 130 has configured its own protocol parameters as full-duplex. In this case, the first device 110 will see a relatively large number of collisions as indicated in sub-step 231(*c*). If the first device 110 has configured its own protocol parameters as full-duplex, then the responding second device 130 will have a protocol mismatch only if the second device 130 has configured its own protocol parameters as half-duplex. In this case, the first device 110 will see a relatively small number of induced packet messages 131.

At a flow point 240, the first device 110 has thus determined protocol parameters used by the responding second device 130 relating to half-duplex or full-duplex use of the communication network 120, and whether those protocol parameters match corresponding protocol parameters used by the first device 110.

At a step 241, the first device 110 repeats the steps from the flow point 210 through and including the flow point 240 a number of times, so that any traffic anomalies on the communication network 120 are accounted for. In a preferred embodiment, the first device 110 repeats those steps about three times, each time determining whether or not there is a protocol mismatch, and adjusting its protocol parameters (as described below with regard to step 242) in response to a majority vote of results.

At a step 242, the first device 110 adjusts its protocol parameters to match corresponding protocol parameters used by the responding second device 130. In alternative embodiments, the first device 110 may cause an operator to adjust protocol parameters used by the responding second device 130 so as to match corresponding protocol parameters used by the first device 110.

At a flow point 250, the first device 110 and the responding second device 130 are thus using matching protocol parameters relating to half-duplex or full-duplex use of the communication network 120.

The method 200 is performed one or more times starting from the flow point 210 and continuing therefrom. In a preferred embodiment, the first device 110 repeatedly performs the method 200, starting from the flow point 210 and continuing therefrom, so as to periodically and continuously determine that there is no parameter mismatch between the first device 110 and the responding second device 130. If the set of responding second devices 130 is fewer than five in number, the method 200 might be performed a greater number of times to determine statistically relevant results. However, for the invention to provide its advantages, there is no particular requirement for such repetition, and the method 200 need only be performed on initial connectivity between the first device 110 and the responding second device 130.

Generality of the Invention

The invention has general applicability to various fields of use, not necessarily related to the techniques described above. For example, these fields of use can include automatic error detection and diagnosis of communication parameters for other types of devices, other communication links, and other communication protocols.

Other and further applications of the invention in its most general form, will be clear to those skilled in the art after perusal of this application, and are within the scope and spirit of the invention.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A method, including the steps of:
   receiving first and second induced messages at a first device from a second device, said first and second induced messages induced by said first device;
   sending jam packet messages from said first device to said second device, said jam packet messages interfering with said second device sending said second induced messages;
   comparing how many of said first induced messages are received by said first device when said jam packet messages are not present with how many of said second induced messages are received by said first device when said jam packet messages are present; and
   determining whether or not a protocol mismatch exists between said first device and said second device based on a result of said step of comparing, said protocol mismatch relates to configuration of communication between said first device and said second device as half-duplex or full-duplex.

2. A method as in claim 1, further comprising the step of adjusting protocol parameters of said first device to match those of said second device responsive to said step of determining.

3. A method as in claim 1, wherein said first device and said second device communicate over an Ethernet connection.

4. A method as in claim 1, wherein at least one of said first device and said second device includes an end-host or a switch.

5. A method as in claim 1, wherein said first message, second message, and jam packet messages are also sent to one or more other devices.

6. A device, comprising:
   a communication link to at least a second device;
   a processor that executes instructions; and
   a memory storing the instructions including the steps of
   (a) receiving first and second induced messages at a first device from a second device, said first and second induced messages induced by said first device; (b) sending jam packet messages to said second device, said jam packet messages interfering with said second device sending said second induced messages; (c) comparing how many of said first induced messages are received when said jam packet messages are not present with how many of said second induced messages are received when said jam packet messages are present; and (d) determining whether or not a protocol mismatch exists with said second device based on a result of said step of comparing, said protocol mismatch relates to configuration of communication between said device and said second device as a half-duplex or full-duplex.

7. A device as in claim 6, wherein said instructions further include the steps of adjusting protocol parameters of said device to match those of said second device responsive to said step of determining.

8. A device as in claim 6, wherein said device and said second device communicate over an Ethernet connection.

9. A device as in claim 6, wherein at least one of said device and said second device includes an end-host or a switch.

10. A device as in claim 6, wherein said first message, second message, and jam packet messages are also sent to one or more other devices.

* * * * *